UNITED STATES PATENT OFFICE.

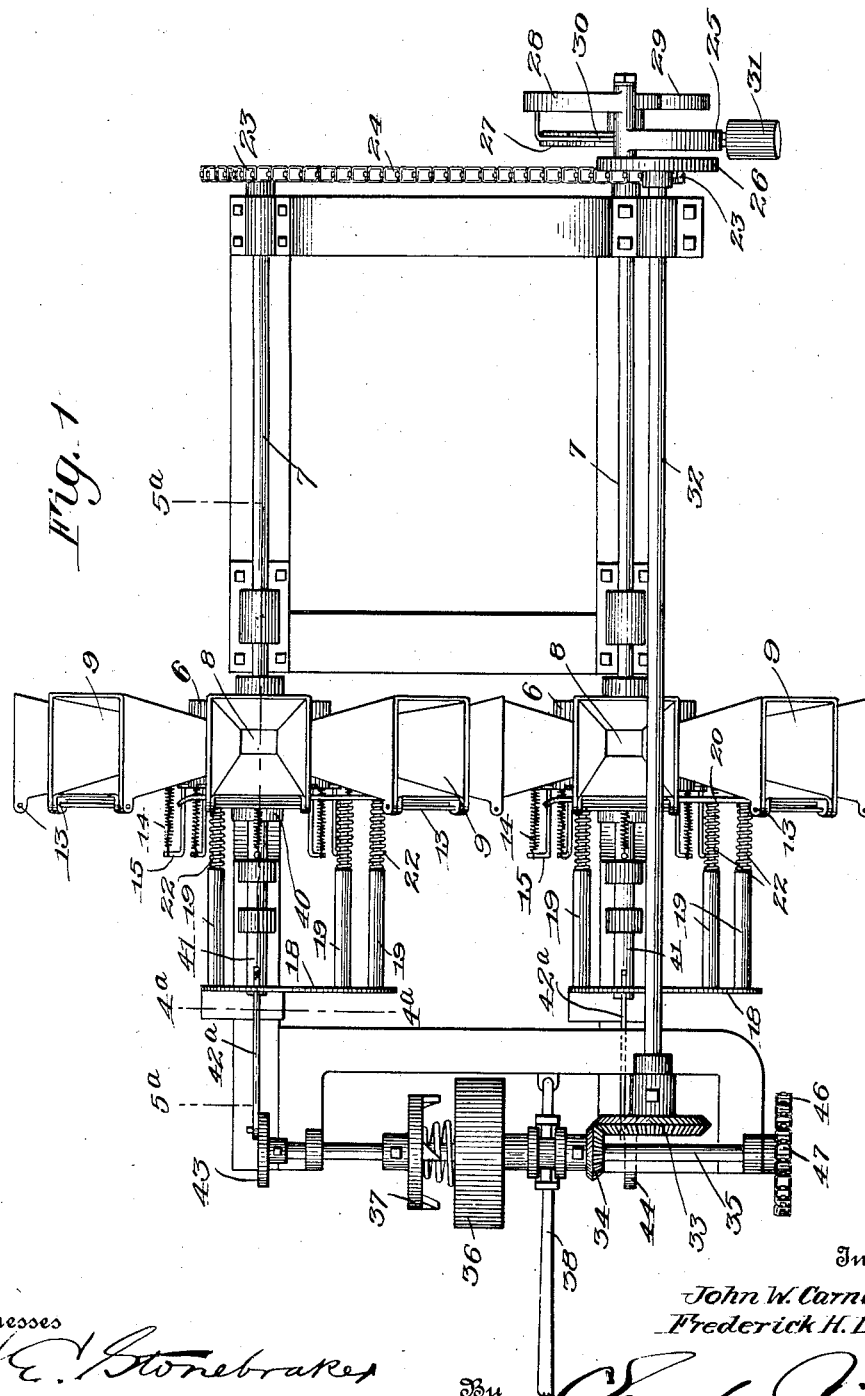

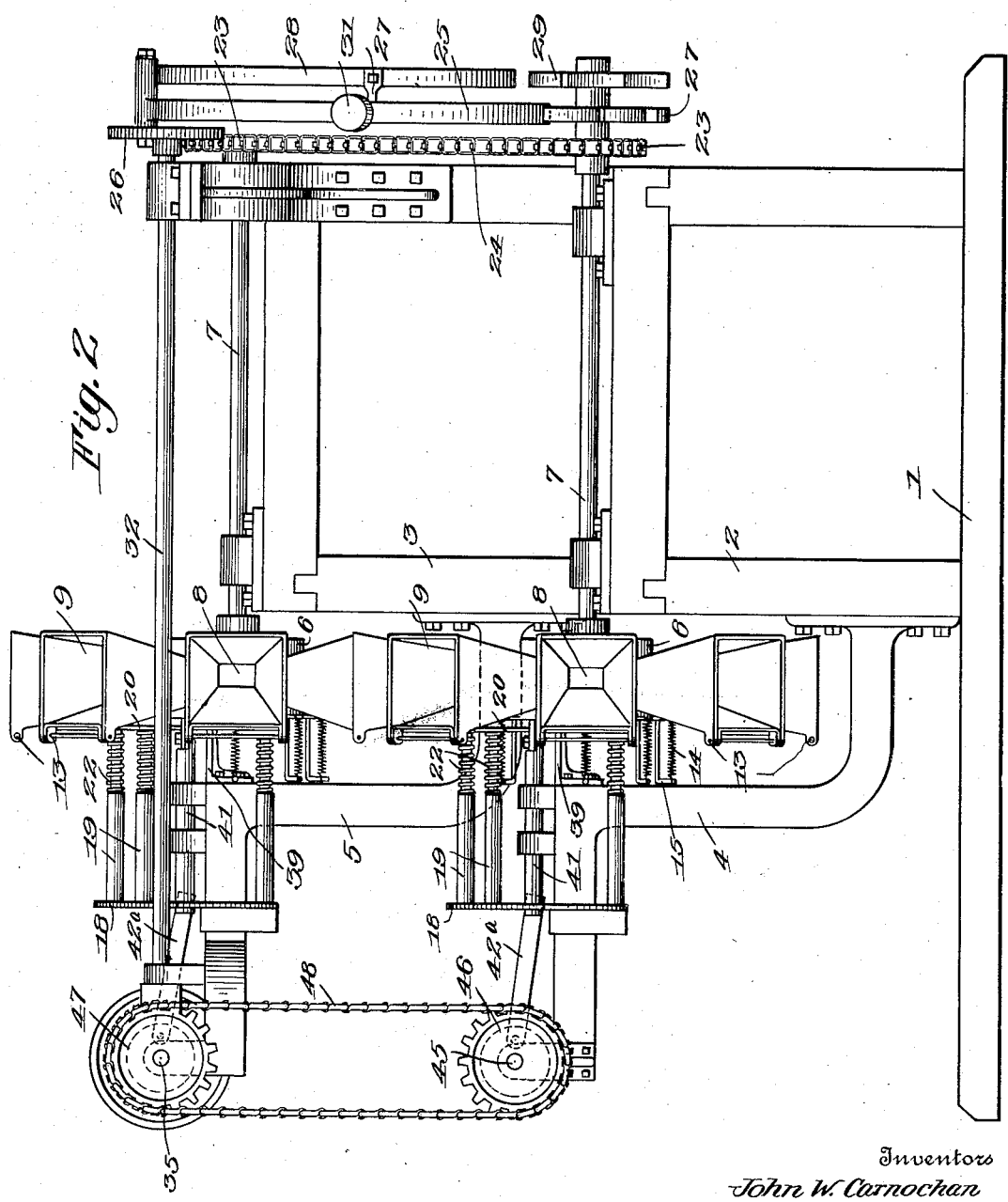

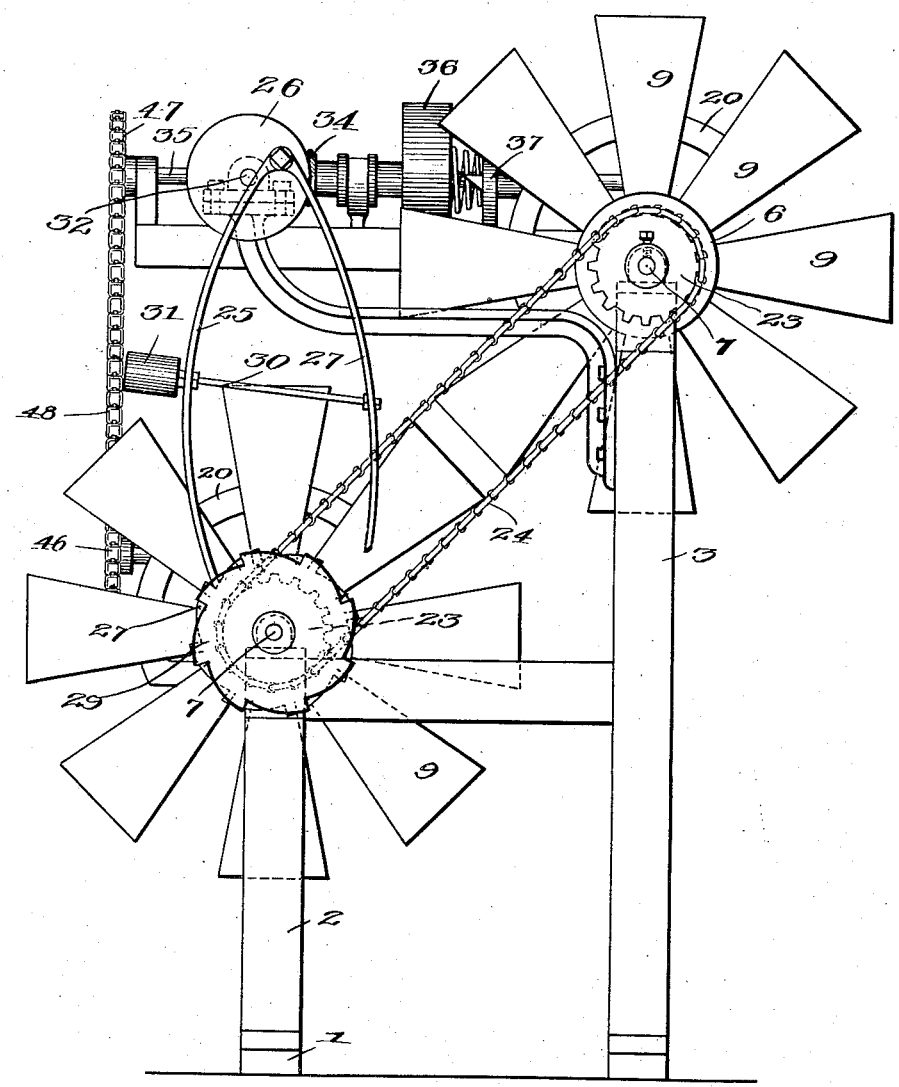

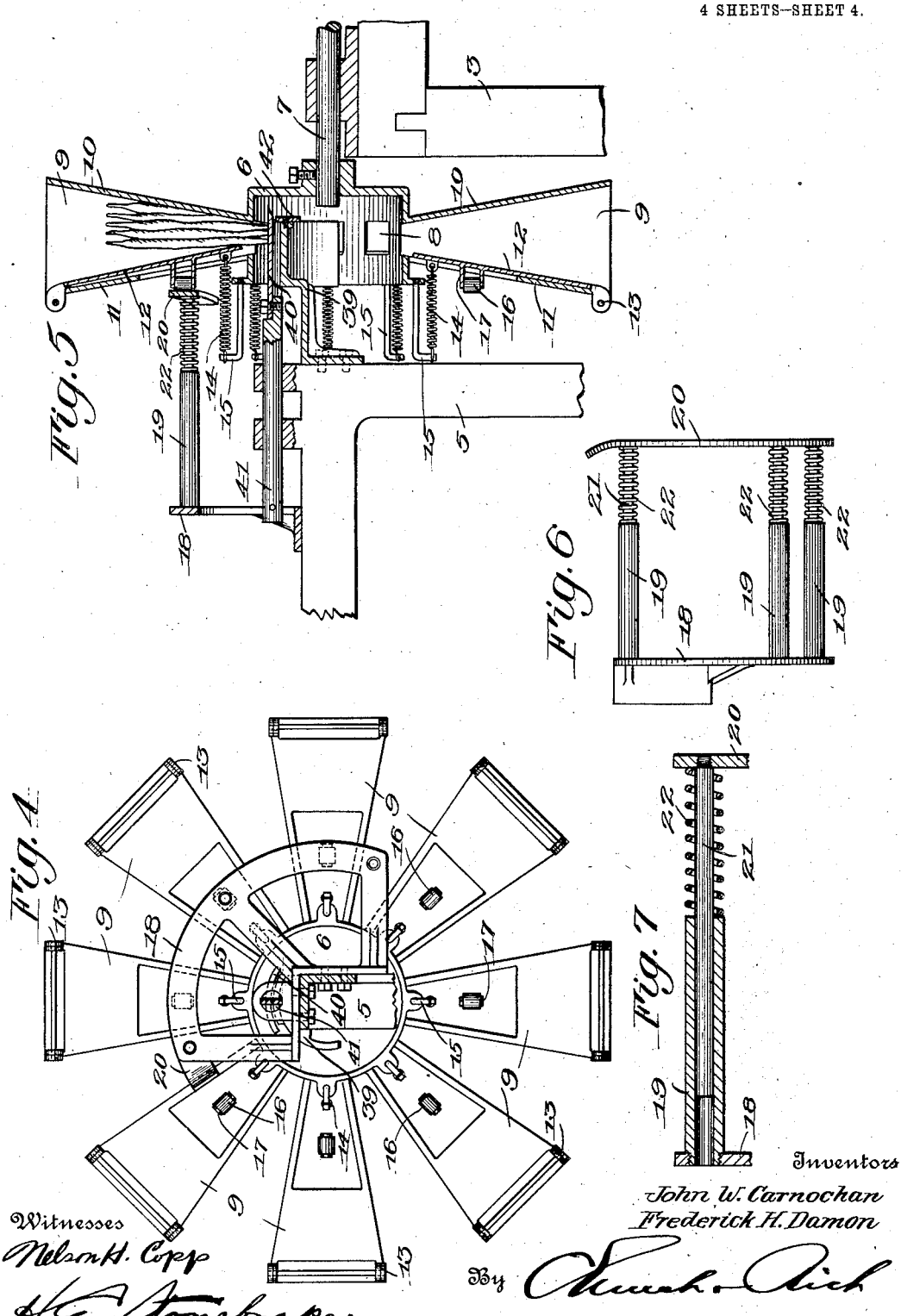

JOHN W. CARNOCHAN AND FREDERICK H. DAMON, OF ROCHESTER, NEW YORK.

BEAN-SNIPPING MACHINE.

1,113,307.  Specification of Letters Patent.  Patented Oct. 13, 1914.

Application filed January 18, 1913. Serial No. 742,845.

*To all whom it may concern:*

Be it known that we, JOHN W. CARNOCHAN and FREDERICK H. DAMON, of Rochester, in the county of Monroe and State of New York, have invented certain new and useful Improvements in Bean-Snipping Machines; and we do hereby declare the following to be a full, clear, and exact description of the same, reference being had to the accompanying drawings, forming a part of this specification, and to the reference-numerals marked thereon.

The present invention relates to bean snipping machines, and it has for its object the provision of an entirely novel construction and arrangement of parts for readily severing the opposite ends from beans, successively, or for other analogous uses.

A further object of the invention consists in providing a machine of extremely simple construction and comparatively few parts, having a large capacity, while at the same time being easily operated.

To these and other ends the invention consists in certain improvements and combinations of parts all as will be hereinafter more fully described, the novel features being pointed out in the claims at the end of the specification.

In the drawings: Figure 1 is a plan view of a machine constructed in accordance with a preferred embodiment of the invention; Fig. 2 is a side elevation of the same; Fig. 3 is an end elevation; Fig. 4 is a view in elevation, partly in section, taken substantially on the line 4$^a$—4$^a$ of Fig. 1; Fig. 5 is a longitudinal sectional view on the line 5$^a$—5$^a$ of Fig. 1; Fig. 6 is a detail elevation, and Fig. 7 is a detail sectional view of one of the movable rods shown in Fig. 6.

Similar reference numerals throughout the several figures indicate the same parts.

According to the present embodiment of the invention, which illustrates a preferred one of several means of carrying the novel features into effect, there is provided a base 1 on which is arranged a frame comprising a lower portion 2 and an upper portion 3, said lower and upper portions having the attached brackets 4 and 5, respectively, for a purpose that will presently appear. The upper and lower portions of the frame have holders for the beans mounted thereon, which are adapted to rotate intermittently, as will be hereinafter pointed out, and preferably embody the hollow hub portions 6 which are fixed upon the shafts 7 and have openings 8 formed in their peripheries to receive the beans, as shown in Fig. 5. Surrounding the hub portions 6 are a series of pockets 9 which are adapted to contain the beans, said pockets comprising the stationary walls 10 and 11, respectively. The holders are provided with gripping devices for retaining the beans in fixed relation to the holder for the necessary length of time, and to this end, the pockets preferably embody, each, a movable wall 12 pivoted at 13 and held in normal position by means of a spring 14 connected to an arm 15 which is suitably mounted upon the hub portion 6. Each of the movable walls 12 of the pockets carries an anti-friction roller 16 mounted in the ears 17.

In order to effect the necessary movement of the yieldable walls 12, to grip the beans during the rotation of the holder, there is provided a wall engaging member, arranged independently of the holder, and to this end, the bracket 5 may be provided with a segmental support 18 which is provided with a series of stationary sleeves 19.

20 is a segmental plate constituting the wall engaging member, and carrying a series of rods 21 which engage the sleeves 19, while 22 designate springs surrounding the rods 21 and disposed between the sleeves 19 and the plate 20. The springs 22 serve to retain the wall engaging member normally in such position as to effect engagement of the movable walls of the pockets with the beans, while at the same time permitting sufficient yielding to prevent breakage of the machine in case an excessive number of beans are fed to the pockets, to the extent of crowding the movable walls of the pockets against the wall engaging member.

The holders may be intermittently rotated by any convenient actuating devices, and a preferred form of such means will now be described. The shaft 7 carrying the holders have attached to their outer ends the sprocket wheels 23 around which travels a sprocket chain 24 by which motion is transmitted from the lower shaft to the upper shaft. Movement of the lower shaft is effected by a lever 25 which is eccentrically pivoted upon the disk 26 and coöperates with the ratchet wheel 27 on the lower shaft 7, while 28 is a locking lever pivoted upon the same axis as the lever 25 and coöperating with a ratchet wheel 29 also fixed upon the lower shaft 7. The teeth of the ratchet wheels 27 and 29 extend in opposite directions so that as the lever 25 reaches the limit of its movement downwardly, the locking lever 28 engages the outer ratchet wheel 29 and prevents further movement of the shaft
7. By this means, a regular intermittent movement of predetermined definite extent is imparted to the holders. An arm 30 is connected to the lever 28, passing through the lever 25, and carries a weight 31, so as to cause the levers normally to hang in position for proper operation. The disk 26 is fixed on a shaft 32 which carries at its opposite end a gear pinion 33 in engagement with the pinion 34 mounted on the shaft 35.
36 is a power pulley running loosely on the shaft 35 and arranged to coöperate with a clutch 37 keyed upon the shaft.

38 is a clutch controlling lever.

When the beans are fed into the pockets of the holders, they rest upon supports 39 which are suitably mounted upon the brackets 4 and 5, respectively, and extend within the hub portions of the holders, serving to hold the beans in proper position until they are gripped by the movement of the pivoted wall in each pocket. The cutting means include cutters 40 which are disposed laterally and adapted to reciprocate longitudinally of the axis of the holders. The cutters are attached to cutter bars 41 and coöperate with the stationary cutting edges 42 secured to the supports 39, so as to snip the ends of the beans as shown in Fig. 5. The cutter bars 41 are pivotally connected by means of links 42ª to the disks 43 and 44, respectively, being pivoted eccentrically thereof whereby to impart a reciprocatory movement to the cutters. The upper disk 43 is fixedly attached to the shaft 35, while the lower disk 44 is fixed upon the shaft 45 which carries a sprocket wheel 46. The shaft 35 has fixed thereon a corresponding sprocket wheel 47, and 48 is a sprocket chain connecting the wheels whereby motion is transmitted from the upper to the lower shaft.

In the operation of the machine, assuming that the holders are stationary, the beans are fed to the upper holder by placing them in the pocket nearest to the operator which is disposed intermediate a horizontal and vertical position, or at an angle of 45°. The actuating devices will then move the holders until said pocket is in a vertical position, during which operation the movable wall of the pocket will have been forced into engagement with the beans by means of the wall engaging member or plate. As soon as said pocket reaches a vertical position, the holders are again brought to a standstill, the actuating devices being so timed as to effect this, whereupon the cutting means operates to snip the ends of the beans. Thereupon, the holder continues to move at regular intervals, and the beans are retained in each pocket until it passes below the wall engaging member and is brought to a point substantially opposite the corresponding pocket in the lower holder, as shown in Fig. 3. At this point, the movable wall which grips the beans will have been released, permitting the beans to fall into the pocket of the lower holder in an inverted position from that which they had held in the upper holder, whereupon the same operation is repeated to snip the opposite ends of the beans, after which they are discharged into any suitable receptacle or conveyer that may be provided.

We claim as our invention:

1. In a bean snipping machine, the combination with a rotatable holder arranged on a horizontal axis, of actuating devices for rotating the holder, and cutting means movable longitudinally of the axis of the holder for severing the ends of the beans.

2. In a bean snipping machine, the combination with a rotatable holder arranged on a horizontal axis, of actuating devices for rotating the holder, cutting means coöperating with the holder for severing the ends of the beans, and gripping devices acting to retain the beans in the holder until the ends are severed and to release them subsequently thereto.

3. In a bean snipping machine, the combination with an intermittently rotating holder arranged on a horizontal axis, of actuating devices for rotating the holder intermittently, and cutting means movable longitudinally of the axis of the holder.

4. In a bean snipping machine, the combination with an intermittently rotating holder arranged on a horizontal axis, of actuating devices for rotating the holder intermittently, cutting means coöperating with the holder to sever the ends of the beans, and gripping devices acting to retain the beans in the holder until the ends are severed and to release them subsequently thereto.

5. In a bean snipping machine, the combination with a pair of rotatable holders arranged one above the other on horizontal axes, of actuating devices for rotating the holders, and cutting means coöperating with the holders for severing the ends of the beans while in the respective holders.

6. In a bean snipping machine, the combination with a pair of rotatable holders arranged one above the other on horizontal axes, of actuating devices for rotating the holders, cutting means coöperating with the holders for severing the opposite ends of the beans while in the respective holders, and gripping devices acting to retain the beans in the holders until the ends are severed and to release them subsequently thereto.

7. In a bean snipping machine, the combination with a pair of intermittently rotating holders arranged one above the other on horizontal axes, of actuating devices for rotating the holders intermittently, and cutting means coöperating with the holders for severing the opposite ends of the beans while in the respective holders.

8. In a bean snipping machine, the combination with a pair of intermittently rotating holders arranged one above the other on horizontal axes, of actuating devices for rotating the holders intermittently, cutting means coöperating with the holders for severing the opposite ends of the beans while in the respective holders, and gripping devices acting to retain the beans in the holders until the ends are severed and to release them subsequently thereto.

9. In a bean snipping machine, the combination of a pair of rotatable holders arranged one above the other on horizontal axes, each including a series of pockets, the pockets on one holder being brought successively into alinement with the corresponding pockets of the other holder, cutting means coöperating with the holders for severing the opposite ends of the beans while in the respective holders, and gripping devices acting to retain the beans in the holders until the ends are severed and to release them from the upper holder as each pocket comes into alinement with the corresponding pocket of the lower holder.

10. In a bean snipping machine, the combination of a pair of intermittently rotating holders arranged one above the other on horizontal axes and each including a series of pockets, the pockets of one holder being brought successively into alinement with the corresponding pockets of the other, of actuating devices for rotating the holders intermittently, cutting means coöperating with the holders for severing the opposite ends of the beans while in the respective holders, and gripping devices acting to retain the beans in the holders until the ends are severed and to release them from the upper holder as each pocket comes into alinement with the corresponding pocket of the lower holder.

11. In a bean snipping machine, the combination with a holder rotatable on a horizontal axis and including a series of pockets, of a rotatable holder arranged above the first mentioned holder on a horizontal axis and including a series of pockets arranged to discharge into the pockets of the first mentioned holder, actuating devices for effecting movement of the holders, and cutting means coöperating with each of the holders.

12. In a bean snipping machine, the combination with an intermittently rotating holder arranged on a horizontal axis and including a series of pockets, of an intermittently rotating holder arranged above the first mentioned holder on a horizontal axis and including a series of pockets adapted to discharge into the pockets of the first mentioned holder, actuating devices for imparting an intermittent movement to the holders simultaneously, and cutting means coöperating with each of the holders.

13. In a bean snipping machine, the combination with a rotating holder, of a second rotating holder arranged above the first mentioned holder, and adapted to discharge into the same, actuating devices for imparting movement to the holders, and cutting means coöperating with each holder.

14. In a bean snipping machine, the combination with an intermittently rotating holder including a series of pockets, of a second intermittently rotating holder arranged above the first mentioned holder and including a series of pockets adapted to be successively alined with the pockets of the first mentioned holder, actuating devices for imparting intermittent movement to the holders simultaneously, and cutting means coöperating with the holders.

15. In a bean snipping machine, the combination with an intermittently rotating holder including a series of pockets, of a second intermittently rotating holder arranged above the first mentioned holder and including a series of pockets adapted to be successively alined with the pockets of the first mentioned holder, actuating devices for imparting intermittent movement to the holders simultaneously, gripping devices acting to retain the beans in pockets of the upper holder until each pocket is in alinement with the corresponding pocket of the lower holder, and cutting means coöperating with the holders.

16. In a bean snipping machine, the combination with a rotatable holder including a series of pockets having fixed relation to the holder, of a movable wall in each pocket, a wall engaging member coöperating with the movable wall during a portion of the travel of the holder to move said wall inwardly of the pocket, actuating devices for rotating the holder, and cutting means coöperating with the holder.

17. In a bean snipping machine, the combination with an intermittently rotatable holder including a series of pockets, of a movable wall in each pocket, a wall engaging member coöperating with the movable wall during a portion of the travel of the holder to move said wall inwardly of the pocket, actuating devices for intermittently rotating the holder, and cutting means coöperating with the holder.

18. In a bean snipping machine, the combination with an intermittently rotating holder arranged on a horizontal axis and including a series of pockets, of a movable wall in each pocket, a wall engaging member coöperating with the movable wall during a portion of the travel of the holder to move said wall inwardly of the pocket, actuating devices for intermittently rotating the holder, and cutting means coöperating with the holder.

19. In a bean snipping machine, the combination with an intermittently rotating holder, of gripping devices arranged on the holder, a member independent of the holder and coöperating with the gripping devices during a portion of the travel of the holder, actuating devices for intermittently rotating the holder, and cutting means coöperating with the holder.

20. In a bean snipping machine, the combination with an intermittently rotating holder arranged on a horizontal axis, of gripping devices arranged on the holder, a member independent of the holder and coöperating with said gripping devices during a portion of the travel of the holder, actuating devices for intermittently rotating the holder and cutting means coöperating with the holder.

21. In a bean snipping machine, the combination with a rotating holder arranged on a horizontal axis, of a laterally disposed cutter operating longitudinally of the axis of said holder, and actuating devices for effecting rotation of the holder and movement of the cutter.

22. In a bean snipping machine, the combination with an intermittently rotating holder arranged on a horizontal axis, of a laterally disposed cutter operating longitudinally of the axis of said holder, and actuating devices for effecting intermittent rotation of the holder and movement of the cutter.

23. In a bean snipping machine, the combination with an intermittently rotating holder arranged on a horizontal axis, of a laterally disposed cutter operating longitudinally of the axis of the holder, and actuating devices for effecting movement of the cutter and for intermittently moving the holder while the cutter is out of operating position.

24. In a bean snipping machine, the combination with a pair of intermittently rotating holders arranged on horizontal axes one above the other, of laterally disposed cutters coöperating with the holders, and actuating devices for effecting simultaneous movement of the cutters and for simultaneously effecting an intermittent movement of the holders while the cutters are out of operating position.

25. In a bean snipping machine, the combination of a holder embodying a hollow hub portion, a stationary support extending within said hub portion, a cutter movable longitudinally of the axis of the holder above said support, and actuating devices for effecting movement of the holder and of the cutter.

26. In a bean snipping machine, the combination of a holder embodying a hollow hub portion having openings therein and surrounded by a series of pockets, a stationary support extending within the hub portion, a laterally reciprocating cutter operating longitudinally of the axis of the holder above the support, and actuating devices for effecting movement of the holder and of the cutter.

27. In a bean snipping machine, the combination of a holder embodying a hollow hub portion having openings therein and surrounded by a series of pockets, a stationary support extending within the hub portion, a laterally reciprocating cutter disposed above the support, each of said pockets including a movable gripping device, and actuating devices for effecting movement of the holder and of the cutter.

28. In a bean snipping machine, the combination of a holder embodying a hollow hub portion having openings therein and surrounded by a series of pockets, each pocket including a spring actuated movable wall, of a wall engaging member coöperating with said movable walls to grip the beans, a stationary support extending within the hub portion, a laterally reciprocating cutter disposed above the support, and actuating devices for effecting movement of the holder and of the cutter.

29. In a bean snipping machine, the combination of an intermittently rotating holder including a hollow hub portion having openings therein and surrounded by a series of pockets, each pocket including a spring actuated movable wall, of a segmental member arranged independently of the holder and coöperating with said movable walls to grip the beans, a stationary support extending within the hub portion, a laterally reciprocating cutter disposed above the support, and actuating devices for effecting intermittent movement of the holder and reciprocation of the cutter.

30. In a bean snipping machine, the combination with a rotatable holder, of actuating devices for rotating the holder, a cutting means movable longitudinally of the axis of the holder for severing the ends of the beans.

31. In a bean snipping machine, the combination with an intermittently rotating holder, of actuating devices for rotating the holder intermittently, and cutting means movable longitudinally of the axis of the holder.

JOHN W. CARNOCHAN.
FREDERICK H. DAMON.

Witnesses:
H. E. STONEBRAKER,
RUSSELL B. GRIFFITH.